US006801621B1

(12) United States Patent
Tennen et al.

(10) Patent No.: US 6,801,621 B1
(45) Date of Patent: Oct. 5, 2004

(54) CIRCUIT AND METHOD FOR ACTIVE TERMINATION OF A TRANSMISSION LINE INTERFACE

(75) Inventors: Aner Tennen, Marlboro, NJ (US); Robert A. Brennan, Jr., Irvine, CA (US)

(73) Assignee: GlobespanVirata, Inc., Red Bank, NJ (US)

( * ) Notice: Subject to any disclaimer, the term of this patent is extended or adjusted under 35 U.S.C. 154(b) by 522 days.

(21) Appl. No.: 09/892,003

(22) Filed: Jun. 26, 2001

Related U.S. Application Data

(63) Continuation-in-part of application No. 09/715,293, filed on Nov. 17, 2000.
(60) Provisional application No. 60/214,173, filed on Jun. 26, 2000.

(51) Int. Cl.[7] .......................... H04M 1/00; H04M 3/00; H04M 7/00
(52) U.S. Cl. ....................... 379/345; 379/402; 379/403; 379/404; 326/30; 375/220
(58) Field of Search .......................... 379/345, 399.01, 379/399.02, 402, 403–404, 413.02, 413.03, 398; 326/30, 82; 375/220, 258

(56) References Cited

U.S. PATENT DOCUMENTS

| | | | | | |
|---|---|---|---|---|---|
| 5,107,230 A | * | 4/1992 | King | .......................... | 326/86 |
| 5,381,082 A | * | 1/1995 | Schlicht | ...................... | 323/280 |
| 5,936,393 A | * | 8/1999 | Nauta | ........................ | 323/316 |
| 6,133,725 A | * | 10/2000 | Bowhers | .................. | 324/158.1 |
| 6,351,185 B1 | * | 2/2002 | Amrany et al. | ............. | 330/253 |
| 6,400,772 B1 | * | 6/2002 | Chaplik | ...................... | 375/258 |
| 6,538,510 B1 | * | 3/2003 | Amrany et al. | ............. | 330/252 |
| 6,580,286 B1 | * | 6/2003 | Tennen | ........................ | 326/30 |
| 6,580,760 B1 | * | 6/2003 | Larsen | ....................... | 375/257 |
| 6,593,770 B2 | * | 7/2003 | Hernandez-Marti | .......... | 326/30 |
| 6,642,707 B1 | * | 11/2003 | Iorga et al. | .............. | 324/158.1 |

* cited by examiner

*Primary Examiner*—Duc Nguyen
(74) *Attorney, Agent, or Firm*—Thomas, Kayden, Horstemeyer, & Risley

(57) ABSTRACT

An improved line driver-hybrid and method for increasing the power efficiency, signal accuracy, and stability of a transmit signal on a transmission line are disclosed. The improved line driver-hybrid uses a negative feedback control loop, thereby enhancing operational stability and suppressing both amplifier imperfections and discrete component manufacturing variances. Furthermore, the improved line driver-hybrid provides a power efficient full duplex solution for line driver applications. The present invention can also be viewed as providing a method for actively terminating a transmission line. The method broadly includes: applying a transmit signal to a line driver; amplifying the transmit signal; applying the amplified transmit signal to a transmission line load to generate a load current; sensing the load current; applying the sensed load current in a negative feedback loop to generate a feedback signal responsive to the load current; applying the feedback signal to a hybrid network to emulate the transmission line load; and applying the line driver output voltage to the hybrid network to emulate the transmit signal and a remotely generated receive signal coupled to the transmission line.

32 Claims, 9 Drawing Sheets

CIRCUIT AND METHOD FOR ACTIVE TERMINATION OF A TRANSMISSION LINE INTERFACE

CROSS-REFERENCE TO RELATED APPLICATIONS

The present application is a continuation-in-part and claims the benefit of co-pending U.S. utility patent application, issued Ser. No. 09/715,293, and filed Nov. 17, 2000, which is hereby incorporated by reference in its entirety. The present application also claims the benefit of co-pending U.S. provisional patent application, issued serial No. 60/214,173, and filed Jun. 26, 2000, which is hereby incorporated by reference in its entirety.

FIELD OF THE INVENTION

The present invention generally relates to high-speed data communications on a transmission line. More specifically, the invention relates to an improved hybrid and line driver with active line termination.

BACKGROUND OF THE INVENTION

With the advancement of technology, and the need for instantaneous information, the ability to transfer digital information from one location to another, such as from a central office (CO) to a customer premise (CP) has become more and more important.

In a digital subscriber line (DSL) communication system, and more particularly an xDSL system where "x" indicates a plurality of various standards used in the data transfer, data is transmitted from a CO to a CP via a transmission line, such as a two-wire twisted pair, and is transmitted from the CP to the CO as well, either simultaneously or in different communication sessions. The same transmission line might be utilized for data transfer by both sites or the transmission to and from the CO might occur on two separate lines. In this regard, reference is now directed to FIG. 1, which illustrates a prior art xDSL communication system 1. Specifically, FIG. 1 illustrates communication between a central office (CO) 10 and a customer premise (CP) 20 by way of twisted-pair telephone line 30. While the CP 20 may be a single dwelling residence, a small business, or other entity, it is generally characterized as having plain old telephone system (POTS) equipment, such as a telephone 22, a public switched telephone network (PSTN) modem 25, a facsimile machine 26, etc. The CP 20 may also include an xDSL communication device, such as an xDSL modem 23 that may permit a computer 24 to communicate with one or more remote networks via the CO 10. When a xDSL service is provided, POTS filter 21 might be interposed between the POTS equipment (e.g., the phone 22, the PSTN modem 25, and the facsimile machine 26) and the twisted-pair telephone line 30. As is known, the POTS filter 21 includes a low-pass filter having a cut-off frequency of approximately 4 kilohertz to 10 kilohertz, in order to filter high-frequency transmissions from the xDSL communication device 23 and to protect the POTS equipment from the higher frequency xDSL equipment (e.g., the xDSL modem 23 and the computer 24).

At the CO 10, additional circuitry is typically provided. Generally, a line card (i.e., Line Card A) 18, containing line interface circuitry, is provided to communicatively couple various xDSL service related signals along with PSTN voice signals to the twisted-pair telephone line 30. In fact, multiple line cards 14, 18 may be provided to serve a plurality of copper telephone subscriber loops. In the same way, additional interface circuit cards are typically provided at the CO 10 to handle different types of services. For example, an integrated services digital network (ISDN) interface card 16, a digital loop carrier line card 17, and other circuit cards, for supporting similar and other communication services, may be provided.

A digital switch 12 is also provided at the CO 10 and is configured to communicate with each of the various line cards 14, 16, 17, and 18. At a PSTN interface side of the CO (i.e., the side opposite the various line cards 14, 16, 17, and 18 supporting the telephone subscriber loops), a plurality of trunk cards 11, 13, and 15 are typically provided. For example, an analog trunk card 11, a digital trunk card 13, and an optical trunk card 15 are illustrated in FIG. 1. Typically, these circuit cards have outgoing lines that support numerous multiplexed xDSL service signal transmissions.

Having introduced a conventional xDSL communication system 1 as illustrated and described in relation to FIG. 1, reference is now directed to FIG. 2, which is a prior art functional block diagram further illustrating the various functional elements in a xDSL communications link 40 between a line card 18 located within a CO 10 and a xDSL modem 23 located at a CP 20 as introduced in FIG. 1. In this regard, the xDSL communications link 40 of FIG. 2 illustrates data transmission from a CO 10 to a CP 20 via a transmission line 30, such as, a twisted-pair telephone transmission line as may be provided by a POTS service provider to complete a designated link between a CO 10 and a CP 20. In addition, FIG. 2 further illustrates data transmission from the CP 20 to the CO 10 via the same twisted-pair telephone transmission line 30. With regard to the present illustration, transmission of data may be directed from the CP 20 to the CO 10, from the CO 10 to the CP 20 or in both directions simultaneously. Furthermore, data transmissions can flow on the same twisted-pair telephone transmission line 30 in both directions, or alternatively on separate transmission lines (one shown for simplicity of illustration). Each of the separate transmission lines may be designated to carry data transfers in a particular direction either to or from the CP 20.

The CO 10 may include a printed circuit line card 18 (see FIG. 1) that includes a CO-digital signal processor (DSP) 43, which receives digital information from one or more data sources (not shown) and sends the digital information to a CO-analog front end (AFE) 45. The CO-AFE 45 interposed between the twisted-pair telephone transmission line 30 and the CO-DSP 43 may convert digital data, from the CO-DSP 43, into a continuous time analog signal for transmission to the CP 20 via the one or more twisted-pair telephone transmission lines 30.

One or more analog signal representations of digital data streams supplied by one or more data sources (not shown) may be converted in the CO-AFE 45 and further amplified and processed via a CO-line driver 47 before transmission by a CO-hybrid 49, in accordance with the amount of power required to drive an amplified analog signal through the twisted-pair telephone transmission line 30 to the CP 20.

As is also illustrated in FIG. 2, the xDSL modem 23 located at the CP 20 may comprise a CP-hybrid 48. The CP-hybrid 48 may be used to de-couple a received signal from the transmitted signal in accordance with the data modulation scheme implemented by the particular xDSL data transmission standard in use. A CP-AFE 44, also located at the CP 20, may be configured to receive the de-coupled received signal from the CP-hybrid 48. The CP-AFE 44 may be configured to convert the received analog signal into a digital signal, which may then be transmitted to a CP-DSP 42 located at the CP 20. Finally, the digital information may be further transmitted to one or more specified data sources such as the computer 24 (see FIG. 1).

In the opposite data transmission direction, one or more digital data streams supplied by one or more devices in communication with the CP-DSP 42 at the CP 20 may be converted by the CP-AFE 44 and further amplified via CP-line driver 46. As will be appreciated by those skilled in the art, the CP-line driver 46 may amplify and forward the transmit signal with the power required to drive an amplified analog signal through the twisted-pair telephone transmission line 30 to the CO 10. It is significant to note that the CP-hybrid 48 is used to regenerate the transmit signal so it may be subtracted from the receive signal when the DSL communication system 1 is receiving at the CP 20. As a result, the CP-hybrid 48 does not affect the transmitted signal in any way. The CO-AFE 45 may receive the data from the CO-hybrid 49, located at the CO 10, which may de-couple the signal received from the CP 20 from the signal transmitted by the CO 10. The CO-AFE 45 may then convert the received analog signal into one or more digital signals, which may then be forwarded to the CO-DSP 43 located at the CO 10. Finally, the digital information may also be distributed to one or more specified data sources (not shown) by the CO-DSP 43.

Having briefly described a xDSL communications link 40 between the line card 18 located within the CO 10 and the xDSL modem 23 located at the CP 20 as illustrated in FIG. 2, reference is now directed to FIG. 3. In this regard, FIG. 3 is a prior art circuit schematic that illustrates a conventional hybrid 49.

As shown in FIG. 3, a transmit signal, TX, may be provided from the CO-Line Driver 47 (FIG. 2) and applied across a back-matching resistor 57, herein labeled, "$R_b$." As is further illustrated in FIG. 3, impedance and voltage scaling may be performed by coupling the transmit signal, TX', to a two-wire transmission line, herein labeled, "TIP" and "RING" via a transformer 59.

As is also illustrated in FIG. 3, the transmit signal, TX, may be applied to a scaled voltage divider consisting of a first impedance 53, labeled, "$Z_b$," and a second impedance 55, labeled, "$Z_m$." The first impedance 53 may be configured such that it emulates a scaled version of the back-matching resistor 57. For example, if the back-matching resistor ($R_b$) is implemented with a resistor having a resistance of X Ohms, the first impedance 53, $Z_b$, may be implemented such that its equivalent impedance is nX Ohms. Similarly, the second impedance 55, $Z_m$, may be configured such that it emulates the load impedance (i.e., the line impedance reflected to the primary), multiplied by the same scale factor, n. In a manner well known in the art, the transmit signal, TX', may be echoed across the second impedance 55 and may be subtracted from a duplex signal, $V_{DUPLEX}$, comprising the combined receive and transmit signals, RX' and TX', respectively, appearing at the primary of the transformer 59 by a hybrid amplifier 61. As further illustrated in FIG. 3, the output of the hybrid amplifier 61, should comprise the received signal, RX", from a remotely located transmitter after the transmit signal, TX', has been subtracted.

In systems designated for data transmission over metallic transmission lines 30, the line driver amplifier 47 is the power amplifier that delivers the necessary energy to transmit a signal through the transmission line 30 through the back-matching resistor 57. The back-matching resistor 57 serves two purposes. First, the back-matching resistor 57 matches the impedance at the end of the transmission line 30. In order to provide a sufficient return loss, a resistor approximately equal to the transmission line's 30 characteristic impedance must terminate the line. Second, the back-matching resistor 57 permits the hybrid 49 to simultaneously receive signals generated from a remote transmitter coupled to the transmission line 30 at the same time the line driver 47 is transmitting. The line driver 47 cannot terminate the transmission line 30 alone because the line driver 47 presents a low load impedance to the remotely transmitted signal, RX. As a result, using a line driver 47 alone would be the equivalent of shunting the remote signal to ground, thus making the receive signal, RX, unrecoverable. The remotely transmitted signal, RX, is recovered by subtracting from the voltage on the transmission line 30 (i.e., the duplex signal) the voltage introduced on the transmission line 30 by the local transmitter, TX'. As shown, the hybrid amplifier 61 performs the task of separating and recovering the remotely transmitted signal (i.e., the received signal) from the transmission line 30.

For simplicity of illustration and description, the prior art hybrid circuit of FIG. 3 is depicted in a single-ended configuration. Those skilled in the art will appreciate that in practice a differential and balanced version of the hybrid 49 may be implemented. The hybrid 49 functions properly if the line driver 47 has a low output impedance. From a data transmission viewpoint, the output of the line driver 47 is an amplified version of the transmit signal. This amplified version of the transmit signal, TX, is applied across a voltage divider comprising the back-matching resistor 57 and the line impedance seen from the primary winding of the transformer 59. As a result, a voltage corresponding to the amplified transmit signal is present on the primary of the transformer 59.

From a data receive viewpoint, a receive signal, RX, originating at a CP 20 may arrive at the secondary winding of the transformer 59. As is known, a corresponding receive signal voltage, RX', is created via inductance on the primary winding of the transformer 59 and results in a current flowing into the back-matching resistor 57. Since the line driver 47 has a low output impedance, no component of the receive signal, RX', is present at the output of the line driver 47, which leaves only the amplified transmit signal, TX, at the output of the line driver 47. Since the xDSL communication system 1 operates in a substantially linear fashion, superposition applies and the voltage across the primary winding of the transformer 59, $V_{DUPLEX}$ consists of both the receive, RX', and the transmit signals, TX'.

If the voltage divider (i.e., the impedances 53, 55) replicates the voltage divider formed by the back-matching resistor 57 and the line impedance seen from primary winding of the transformer 59, then the voltage at the junction between the impedances 53, 55 is identical to the voltage that would be applied across the transformer primary in the absence of a far end generated receive signal, TX'. As a result, the receive signal, RX, can be recovered by simply taking the difference between the voltage at the primary winding of the transformer 59 and the voltage at the junction between the first and second impedances 53, 55. Hence, it is possible to simultaneously transmit and receive.

The conventional hybrid 49 circuit of FIG. 3 has the additional characteristic that signal components introduced by the line driver 47 to the transmitted signal, TX, are removed by the hybrid 49. In particular, transmit signal components due to imperfections in the line driver 47, such as noise and distortion, are removed by the hybrid 49 and do not get forwarded to the CO-AFE 45 (FIG. 2) with the remotely generated receive signal. This functional aspect of the hybrid 49 is important because typically a high-power amplifier, such as the line driver 47 amplifier, which provides the transmit signal, will not be characterized by negligible noise and distortion at the required xDSL data transmission power levels.

The conventional hybrid 49 circuit of FIG. 3 suffers from the disadvantage that it is relatively inefficient. The voltage swing and power ultimately delivered to the primary winding of the transformer 59 and hence the secondary winding and the transmission line 30, is lower than the voltage swing and power sourced by the line driver 47. When a differential line driver configuration is used, the line driver amplifier dissipates 2(V×l) Watts in order to transmit and recover signals along the transmission line 30. Less than 50% of the power dissipated in the line driver amplifier is actually delivered to the transmission line 30 with a portion being dissipated in the back-matching resistor(s), $R_b$ 57. Consequently, the power and voltage efficiency of a conventional line driver is less than 50%.

Assuming that the first and second impedances 53, 55 have a sufficiently large and relatively matched impedance so that the power consumed within these impedances 53, 55 is relatively negligible, a portion of the power delivered by the line driver 47 is dissipated in the back-matching resistor 57 with the remaining portion available at the primary winding of the transformer 59. That portion of the transmit signal dissipated in the back-matching resistor 57 can be reduced by reducing the magnitude of the resistance. However, the back-matching resistor 57 cannot be made arbitrarily small because the transmission line 30 would not be properly terminated at the primary winding of the transformer 59. Since the line driver 47 has a very small output impedance there would be no way of recovering the remotely generated receive signal, RX.

One way to avoid the power inefficiency inherent in the hybrid 49 presented in FIG. 3 is to construct a feedback circuit around the line driver 47 amplifier. Such a feedback circuit is presented in the circuit of FIG. 4. The circuit schematic presented in FIG. 4 and generally identified with reference numeral 60 is an example of a combination of a line driver 47 in cooperation with a positive feedback network and the transformer 59 of FIG. 3.

As illustrated in FIG. 4, a line driver amplifier with active termination 65 may be coupled with the transformer 59 of FIG. 3 to provide a transmit signal, TX', at the primary 5 winding of the transformer 59. This configuration may further provide an inductively coupled transmit signal, TX", on a transmission line 30 that is electrically coupled to the secondary of the transformer 59. In this way, the line driver with active termination 65 appears as a voltage source at its output terminal with a low-output impedance in series with a finite impedance. The apparent impedance may be adjusted such that the impedance matches the resistance of the back-matching resistor 57 of FIG. 3. The procedure of using feedback with an amplifier to generate an apparent impedance is generally known as active termination. The circuit schematic presented in FIG. 4 illustrates a relatively simple single-ended version of a line driver amplifier 47 with a positive-feedback resistive network. For simplicity of illustration and description a single-ended version of the line driver with active termination 65 is presented. This presentation is by way of example only. Those skilled in the art will appreciate that a differential circuit implementation is typically selected to provide a line driver with active termination 65.

As illustrated in the exemplary circuit architecture of FIG. 4, the feedback network may comprise a plurality of individual components, typically resistors, generally configured as follows. A first resistor 71, herein labeled, "$R_1$," may be interposed between an input or transmit signal terminal and the positive input terminal of the line driver power amplifier 47. A second resistor 73, labeled, "$R_2$," may be placed between the positive input terminal of the line driver power amplifier 47 and an output terminal of the line driver with active termination 65. A third resistor 75, labeled, "$R_G$," may be applied between signal ground and a negative input terminal of the line driver power amplifier 47. A fourth resistor 79, herein labeled, "$R'_B$," may be interposed between the output of the line driver power amplifier 47 and the output terminal of the line driver with active termination 65. A fifth resistor 77, labeled, "$R_F$," may be placed between the negative input terminal of the line driver power amplifier 47 and the output terminal of the line driver amplifier 47 as shown.

It can be further shown that, as viewed from the primary winding of the transformer 59, the resistive network surrounding the line driver power amplifier 47 may cause the voltage across the primary winding to vary as a function of the current, $I_L$, flowing through the primary winding, so that the primary winding appears to be driven by a voltage source through a finite impedance. With a suitable choice of resistance values for the various resistors 71, 73, 75, and 77, the apparent finite impedance can be shown to be the resistance value of the fourth resistor 79, (i.e., $R'_B$) multiplied by a factor given by the resistance values of the other resistors 71, 73, 75, and 77. Similarly, the equivalent line driver transmit gain of the line driver with active termination 65 (assuming an unloaded condition) may be determined in accordance with equation 1 using the resistance values for the various resistors 71, 73, 75, and 77.

More specifically, the equivalent line driver gain may be determined as follows:

$$A_0 = \frac{(A-K)}{(1-K)}. \qquad \text{Eq. 1}$$

where, $$A = \frac{(R_G + R_F)}{R_G} \text{ and } K = \frac{A \times R_1}{(R_1 + R_2)}.$$

Similarly, the apparent back-matching resistance may be determined from the following function:

$$R_{OUT} = \frac{R'_B}{(1-K)}. \qquad \text{Eq. 2}$$

Since the apparent back-matching resistance is not implemented as a physical resistor, but rather by controlling the output voltage as a function of the output current, little power is dissipated and little signal swing is lost. In the limit, if the fourth resistor 79, $R'_B$, is implemented with a very low resistance value and the other resistors 71, 73, 75, and 77 are implemented to give the desired apparent resistance, virtually all the power from the line driver power amplifier 47 may be delivered to the primary winding of the transformer 59. In this case, the remotely generated receive signal, RX, sees the appropriate back-matching resistance (i.e., impedance) and the receive signal, RX', can be recovered from the primary winding of the transformer 59.

The line driver with active termination 65 illustrated in FIG. 4 has several drawbacks. First, the feedback network in cooperation with the line driver power amplifier 47 uses positive feedback. This can be determined by examining the expressions for determining the equivalent line driver gain, $A_O$, and the apparent back-matching resistance, $R_{OUT}$. Observe that as the various resistance values are changed so that K approaches and then exceeds 1, the behavior of the circuit will qualitatively change as the signs (not only the magnitude) of the equivalent line driver gain, $A_O$, and the apparent back-matching resistance, $R_{OUT}$, change. These breaks or critical points in the functions defining both variables are characteristic of positive feedback systems. Positive feedback, in addition to introducing the qualitative changes noted above, also tends to emphasize component imperfections, system noise, and signal distortion.

Furthermore, a hybrid circuit cannot be connected to the line driver with active termination 65 illustrated in FIG. 4, because there is no node at which the voltage is due solely to the transmit signal other than the un-amplified transmit signal input. The amplified transmit signal can be used to power the divider formed by the first and second impedances 53, 55 (FIG. 3), or equivalent impedances for that matter, which would lead to a recovery of the remotely generated receive signal at the primary winding of the transformer 59 (FIG. 3). However, in contrast to the conventional hybrid of FIG. 2, imperfections in the line driver amplifier 47 (FIG. 3) in the form of noise and distortion would be introduced only onto the primary winding of the transformer 59 (FIG. 3) and not onto the divider formed by the impedances 53, 55 (FIG. 3). As a result, noise and distortion introduced by the line driver amplifier 47 would not be canceled out by the hybrid amplifier 61 (FIG. 3).

Finally, if it were desired to change or adjust the apparent back-matching impedance, $R_{OUT}$, in order to compensate for variance in the manufacture of $R'_B$ while attempting to maintain the equivalent line driver gain, $A_O$, the various resistors 71, 73, 75, and 77 must be adjusted in a complicated way because the gain and back-matching impedance are not independent of one another.

Accordingly, there is a need for a line driver with improved power efficiency that can be used in cooperation with a hybrid to remove line driver generated signal imperfections and to recover a remotely generated receive signal from a duplex signal transmission on a transmission line, while simultaneously reducing the necessary integrated circuit die area required to implement the line driver.

SUMMARY OF THE INVENTION

In light of the foregoing, the invention is a circuit and a method for recovering a remotely generated receive signal from a duplex communication on a transmission line. The improved line driver is capable of efficiently driving a data transmission line with a transmitted signal having reduced line driver amplifier generated signal imperfections and is capable of cooperation with an active termination hybrid to recover a remotely generated receive signal from a duplex signal transmission. The improved line driver architecture of the present invention uses a negative feedback control loop, thereby enhancing operational stability and suppressing both amplifier introduced imperfections and integrated circuit resistor and capacitor manufacturing variances. Furthermore, the improved line driver of the present invention provides a power efficient full duplex solution for line driver applications.

In a preferred embodiment, an improved line driver may comprise an active line termination control loop with a current sense feedback. By integrating the improved line driver with an active termination hybrid the composite circuit (e.g., the active termination line driver together with the active termination hybrid) provides a scaled version of the transmit signal which is free from remotely generated or receive signal effects, as well as, imperfections due to noise and distortion. In addition, the composite circuit provides a power efficient solution through the use of a finite and independently adjustable output impedance that may be used to avoid some of the loss in signal power that is typically dissipated within the line termination (i.e., the back-matching) resistance.

The present invention can also be viewed as providing a method for increasing the stability, power efficiency, and accuracy of a line driver, while actively terminating a transmission line. In one embodiment, the method can be practiced by performing the following steps: applying a transmit signal to an input of a line driver; amplifying the transmit signal; applying the amplified transmit signal to a transmission line load to generate a load current; sensing the load current; and applying the sensed load current in a negative feedback control loop to generate a feedback signal responsive to the load current such that an output impedance that emulates a back-matching resistor is generated.

The present invention can be further viewed as providing a method for recovering a remotely generated signal from a transmission line in a duplex communication system. In one embodiment, the method can be practiced by performing the following steps: applying a transmit signal to an input stage of a line driver; amplifying the transmit signal; using an active termination feedback control loop to generate a feedback signal; amplifying the feedback signal; combining the feedback signal with a duplex signal on a transmission line to generate a scaled transmit signal; applying the amplified feedback signal, and the transmit and receive signal components within the duplex signal to first, second, and third circuit networks configured to emulate a first, second and third transfer function, respectively, wherein the first, second, and third transfer functions emulate a standard hybrid by generating first, second, and third hybrid amplifier inputs; and combining the first, second, and third hybrid amplifier inputs to recover a remotely generated receive signal from the transmission line.

Other features and advantages of the present invention will become apparent to one skilled in the art upon examination of the following drawings and detailed description. It is intended that all such additional features and advantages be included herein within the scope of the improved active termination line driver and hybrid, as defined by the claims.

BRIEF DESCRIPTION OF THE DRAWINGS

The present invention will be more fully understood from the detailed description given below and from the accompanying drawings of the preferred embodiment of the invention, which however, should not be taken to limit the invention to the specific embodiments enumerated, but are for explanation and for better understanding only. Furthermore, the drawings are not necessarily to scale, emphasis instead being placed upon clearly illustrating certain principles of the invention. Finally, like reference numerals in the figures designate corresponding parts throughout the several drawings.

DETAILED DESCRIPTION OF THE PREFERRED EMBODIMENT

Figure 1:
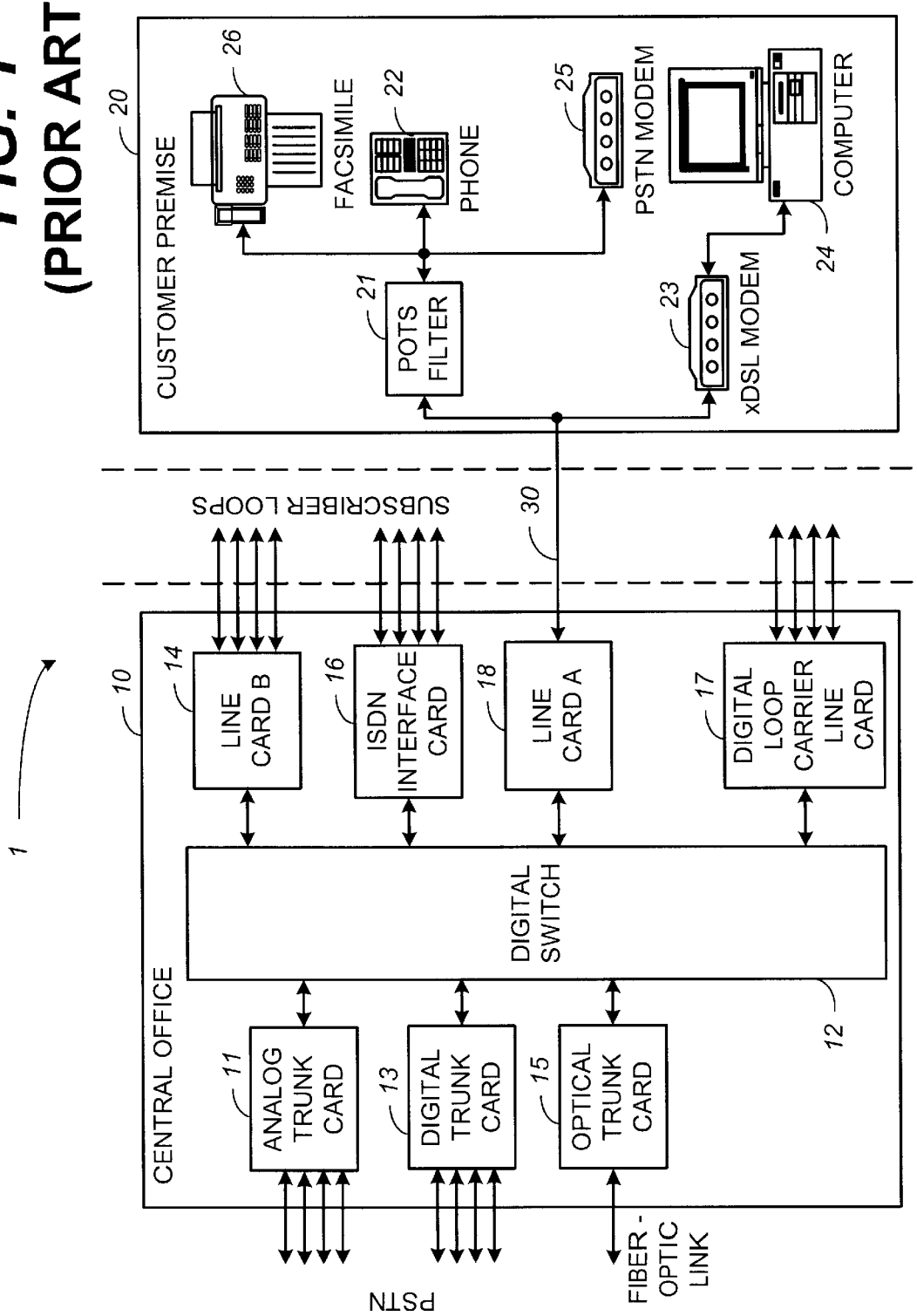
FIG. 1 is a prior art block diagram illustrating a xDSL communications system between a central office (CO) and a customer premise (CP).
Figure 2:
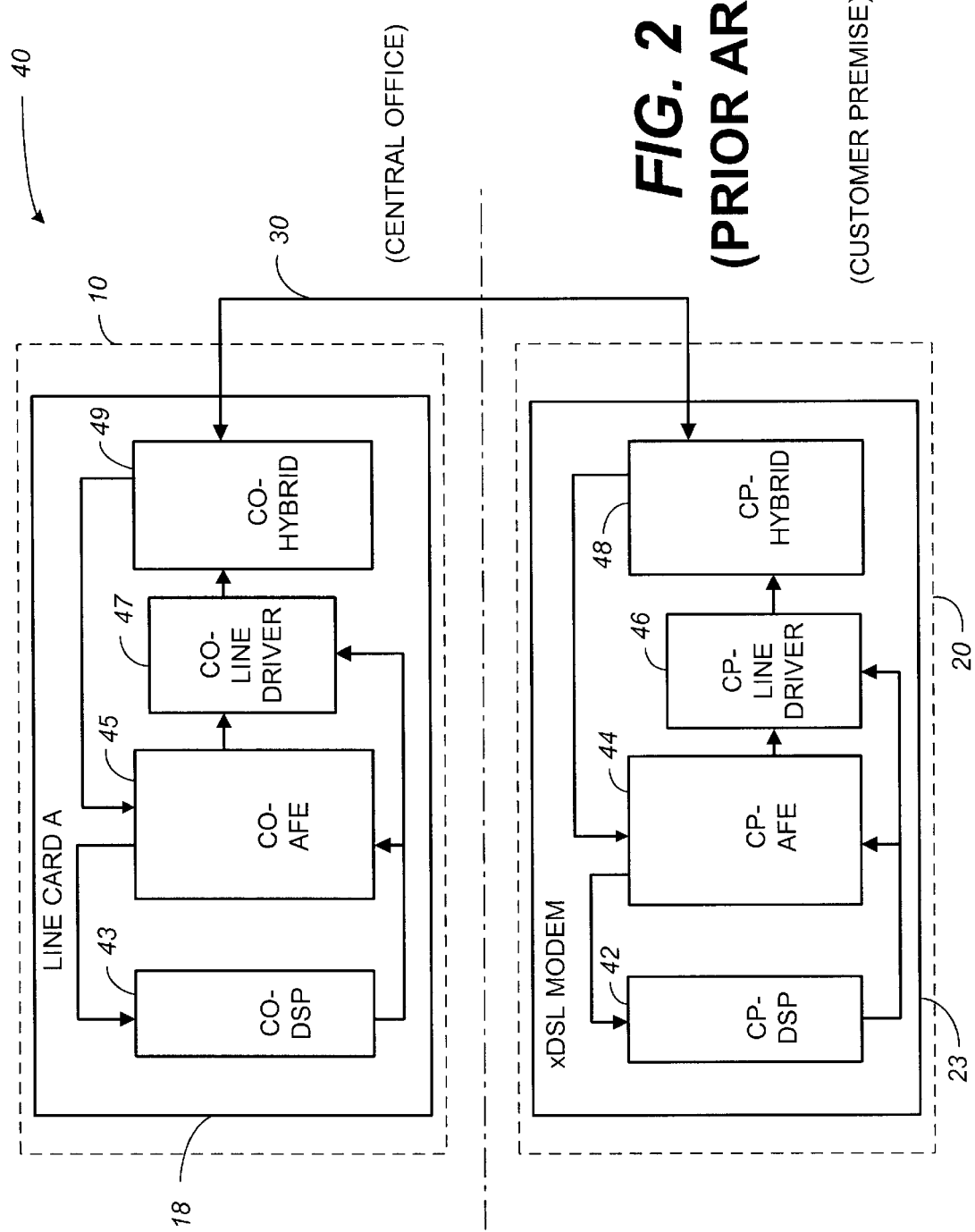
FIG. 2 is a prior art functional block diagram illustrating a xDSL communication link used in the xDSL communication system of FIG. 1 between a line card and a xDSL modem.

It is significant to note that the description presented herein will focus on the line driver 47 and the hybrid 49 (FIG. 2) located within the line card A 18 at the CO 10 within a xDSL communication system 1 (FIG. 1). This explanation and description are by way of example only. Those skilled in the art will appreciate that the concepts and teachings of the present invention may be applied to various line drivers as may be applied in a plethora of systems.

Figure 5:
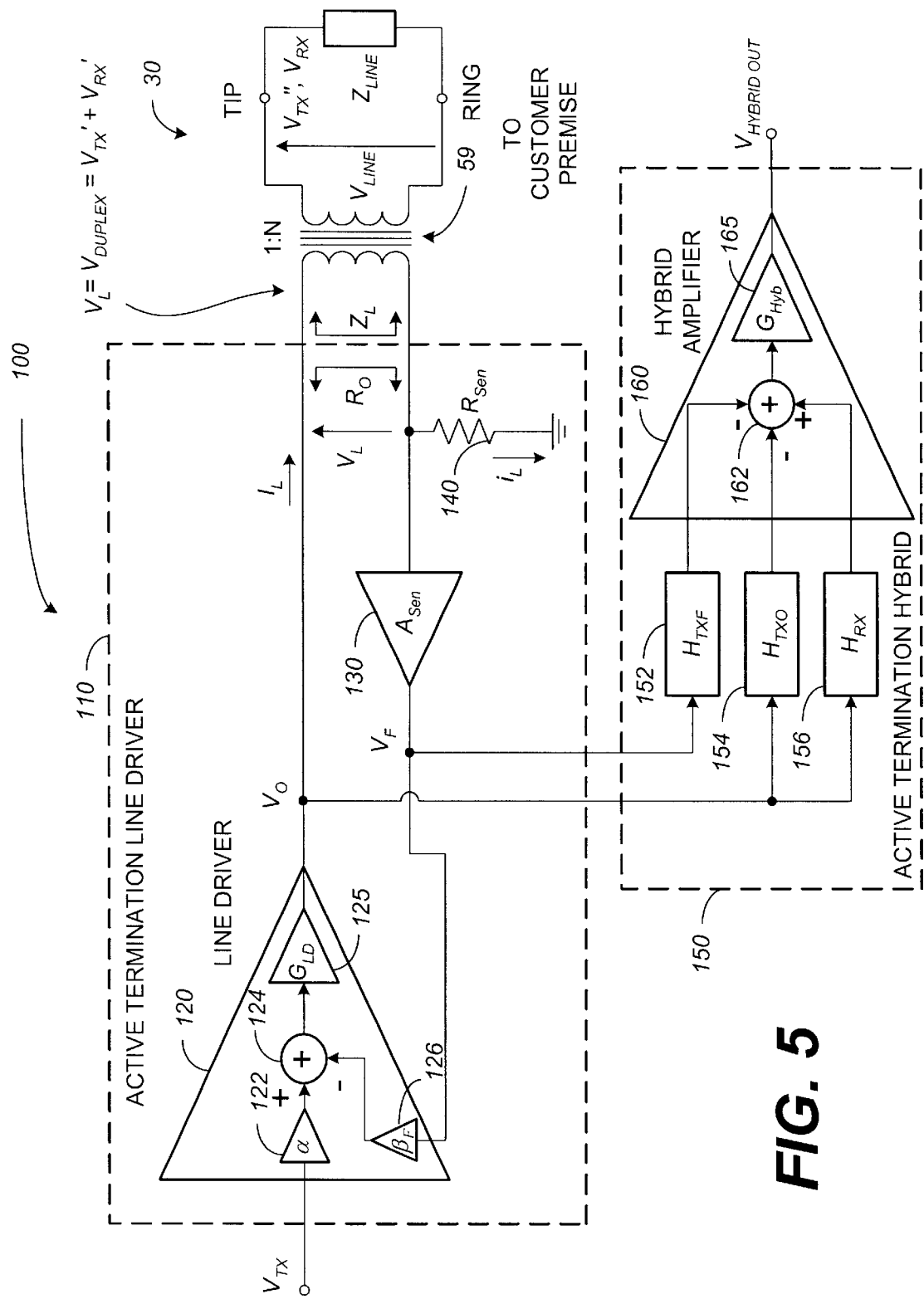
FIG. 5 is a functional block diagram of an improved combination line driver-hybrid in accordance with the present invention.

Turning now to the drawings illustrating the present invention, wherein like reference numerals designate corresponding parts throughout the drawings, FIG. 5 illustrates a functional block diagram of an improved combination line driver-hybrid circuit 100. As illustrated in FIG. 5, the improved combination line driver-hybrid circuit 100 may comprise an active termination line driver 110 associated with an active termination hybrid 150 with the combination coupled to the CO 10 side of an isolation transformer 59. As illustrated in the block diagram of FIG. 5, the active termination line driver 110 can be implemented via a line driver amplifier 120, a sense amplifier 130 (which is not essential in a practical realization), and a current sensing resistor 140.

As shown in FIG. 5, the active termination line driver 110 may receive a transmit signal input, $V_{TX}$, at a transmit signal input port. The transmit signal, $V_{TX}$, may be applied at an input of the line driver amplifier 120. The output of the line driver amplifier 120, $V_O$, is applied at the primary winding of the isolation transformer 59 in order to inductively transfer the transmit signal, $V_{TX}$, along the transmission line 30. In addition to sourcing the load current, $I_L$, needed to transmit the locally generated transmit signal, $V_{TX}$, the line driver amplifier 120 may also be configured to source a sample of the load current, $i_L$, through a resistor, $R_{Sen}$, having a relatively small resistance value. As shown in the functional block diagram of FIG. 5, the sample of the load current, $i_L$, may be applied at a negative line driver amplifier input as $V_F$.

As is further illustrated in the functional block diagram of FIG. 5, the line driver amplifier 120 may be configured with an input pre-scaler 122 (which can be an active amplifier or a passive attenuator). The input pre-scaler 122 is configured to receive the transmit signal, $V_{TX}$, from the transmit signal input port. The input pre-scaler 122 processes the voltage of the transmit signal such that it may be represented by $\alpha V_{TX}$. Similarly, the line driver 120 may be configured with a feedback pre-scaler 126. As in the case of the input pre-scaler 122, the feedback pre-scaler 126, is configured to receive a feedback voltage, $V_F$, from the current sensing resistor, $R_{Sen}$ 140. However, as illustrated in FIG. 5, the line driver amplifier 120 is configured to forward the output of the feedback pre-scaler 126, $\beta_F V_{TX}$, to a negative input terminal (of the line driver amplifier 120) illustrated in the functional block diagram as an adder 124. An output of the adder 124 is then applied to an amplifier 125, having a (closed-loop) gain, $G_{LD}$, to produce an output of the line driver amplifier 120, herein labeled, $V_O$.

As shown in FIG. 5, the line driver amplifier 120 output voltage, $V_O$, is controlled by the output current, which produces the desired emulated output resistance, $R_O$, at the primary winding of the isolation transformer 59. An expression for the emulated output resistance, $R_O$, is given in terms of the block diagram parameters, as follows:

$$R_O = R_{Sen}(1 + A_{Sen} \times G_{LD} \times \beta_F). \qquad \text{Eq. 3}$$

The transmit gain on the primary side of the isolation transformer 59, defined as the ratio of the load voltage, $V_L$, to the input voltage, $V_{TX}$, which is load dependent, may be represented by the following relationship for the case where $Z_L = R_L$:

$$G_{TX} \equiv \frac{V_L}{V_{TX}} = \frac{\alpha \times G_{LD}}{1 + G_{LD} \times \beta_F \times A_{Sen} \times \beta_L}(1 - \beta_L), \qquad \text{Eq. 4}$$

where, $\beta_L$ is the loading factor and is given by:

$$\beta_L = \frac{R_{Sen}}{R_L + R_{Sen}}. \qquad \text{Eq. 5}$$

The composite line driver-hybrid circuit 100 functions as follows. The line driver amplifier 120 within the active termination line driver 110 receives a signal to be transmitted, $V_{TX}$, and is configured to amplify the transmit signal in accordance with a desired transmit signal power. The amplified transmit signal, $V_O$ or $V_{TX}'$, as it is labeled at the isolation transformer 59, may then be passed through a current sensing means 140 capable of sensing the load current, $I_L$, sourced by the line driver amplifier 120. The current sensing function may be implemented by any convenient method, for example a resistor having a small resistance value. In the example of FIG. 5, the current sensing function is performed by the resistor, $R_{Sen}$, 140. The passage of the amplified transmit signal, $V_{TX}'$, through the current sensing means 140 (e.g., $R_{Sen}$) will generate a corresponding small voltage $V = I_L \times R_{Sen}$. With suitable amplification, as may be provided by the combination of the sense amplifier 130 and the feedback pre-scaler 126 (with dimensionless scaling factor designated as $\beta_F$), an appropriate feedback voltage can be developed at the negative input of the summer 124. Consequently, the equivalent of a current sensing resistor with a current-to-voltage conversion ratio of $R_m$ can be implemented (where $R_m$ is a transresistance defined by: $R_m = V_F/I_L = A_{Sen} \times R_{Sen}$). In other words, the sensed value of the load current, $I_L$, may be multiplied by a factor of $R_m$ (which has the dimension of resistance) in order to generate a feedback voltage, herein labeled, "$V_F$." Assuming both the line driver amplifier 120 and the sense amplifier 130 of the active termination line driver 110 have high input impedances, the output of the sense amplifier 130 can be described as follows:

$$V_F = A_{Sen} \times I_L \times R_{Sen}.$$ Eq. 6

As a result of the active termination line driver 110, the load voltage at the primary winding of the transformer 59 can be determined by the following relationship:

$$V_L = G_{LD}(\alpha \cdot V_{TX} - \beta_F \cdot V_F) \cdot (1 - \beta_L),$$ Eq. 7 or in simpler terms, $V_L = A_1 V_{TX} - A_2 I_L R_{Sen}$ (where $A_1$ and $A_2$ are constants that depend from other active termination parameters.) Thus the voltage, $V_L$, applied at the primary winding of the transformer 59 and the current through the winding, $I_L$, are related in a way which corresponds to a voltage source $A_1 V_{TX}$, controlled by the input voltage $V_{TX}$, having a gain $A_1$ in series with an impedance of $A_2 \times R_{Sen}$ Ohms. As a result, the active termination line driver 110 functions as the equivalent of a line driver 47 (FIG. 2) with a transmit gain of $G_{LD}$ $(1+R_b/R_L)$, and a back-matching resistor 57 (FIG. 3) of $$R_b = R_O = R_{Sen}(1 + A_{Sen} \times G_{LD} \times \beta_F) \text{ Ohms}.$$

It is significant to note that the active termination line driver 110 circuit configuration is that of a negative feedback circuit, where, assuming ideal components, any positive values may be used for all design parameters and the gain can be increased without loss of stability or a change in the sign of the output voltage. In other words, the equivalent line driver gain, $\alpha G_{LD}$, and the back-matching impedance, $R_b = Ro$, may vary in magnitude but not in their sign (i.e., $\alpha G_{LD}$ and Ro will never go negative).

In order for a hybrid circuit to provide full duplex signal transmission (i.e., simultaneously transmit and receive separate and distinct signals on a transmission line 30), a voltage which comprises only the amplified transmit signal is required. Note that the output of the line driver amplifier 120 will have a component originating with a remotely generated receive signal, $V_{RX}$. To generate a voltage which is solely reflective of the transmit signal, the composite line driver-hybrid circuit 100 takes the voltage present on the primary winding of the transformer 59, $V_O$, and a voltage, $V_F$, scaled by the gain of the sense amplifier 130 to derive $V_{TXF}$ within the hybrid amplifier 160. As further illustrated in FIG. 5, $V_O$ and $V_F$ can be processed by the hybrid transfer functions 154, 156, and 152 to recover the remotely generated receive signal. It is significant to note that the composite line driver-hybrid circuit 100 architecture illustrated in FIG. 5, permits the active termination hybrid 150 to remove line driver amplifier induced noise and distortion.

It is of further significance to note that the combined line driver-hybrid circuit 100 of FIG. 5 was presented by way of example only. In alternative implementations, the various amplifiers may be merged together and equivalent signal gains could be obtained by appropriate signal scaling techniques well known and appreciated by those skilled in the art. The relative signal strength to and through the hybrid amplifier 160, however, should remain as described above in order to properly recover a remotely generated receive signal free of the effects of a local line driver amplifier 120 responsible for generating a transmit signal in a duplex data transmission scheme.

Figure 4:
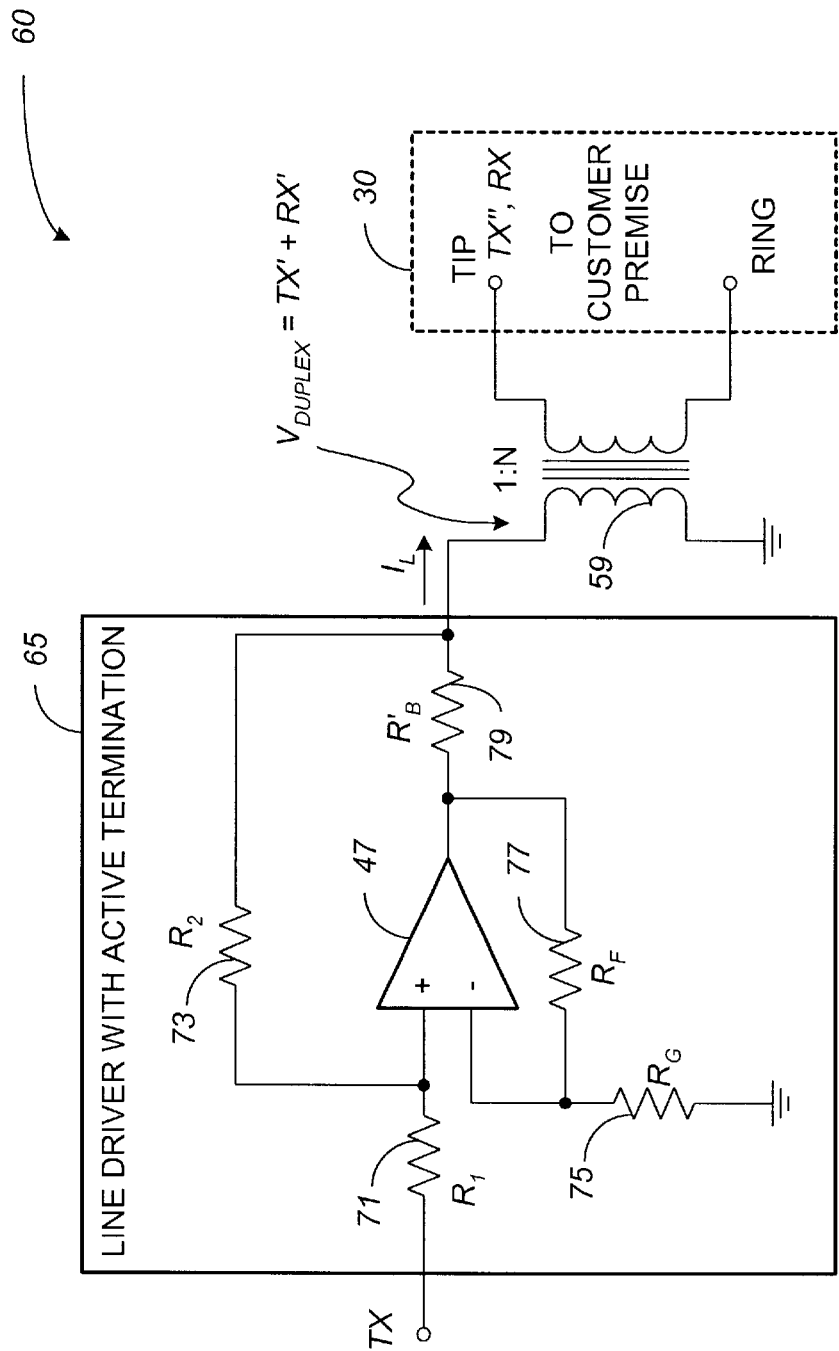
FIG. 4 is a prior art circuit schematic of a line driver having active termination as may be applied to the line driver of FIG. 2.

It is also significant to note that the active termination line driver 110 is quite different from the conventional positive feedback resistive network of FIG. 4. First, the feedback voltage, $V_F$, a quantity proportional to the load current, $I_L$, is made available. Second, the feedback circuit is inherently stable in that the sign of the gain and the transfer function of the feedback amplifier can never change. Furthermore, an output signal, $V_O$, suitable for driving the active termination hybrid 150 is readily available. In this way, the composite line driver-hybrid circuit 100 of FIG. 5, provides full duplex operation while removing some of the difficulties of the simple active termination of FIG. 4.

As illustrated in FIG. 5, the output of the line driver amplifier 120 may serve as a first output of the active termination loop and may be electrically coupled to a first output of the active termination line driver 110. The amplified and current sensed transmit signal, $V_{TX}'$, may then be applied at the primary winding of the isolation transformer 59 or at any other suitable isolation device capable of coupling the amplified transmit signal, $V_{TX}'$, on the transmission line 30.

It will be appreciated that the amplified and current sensed transmit signal, $V_{TX}'$, may be inductively coupled from the primary winding of the transformer 59 to the secondary winding of the transformer 59, where in accordance with the turns ratio of 1:N a scaled version of the amplified and current sensed transmit signal, $V_{TX}''$, may be electrically coupled to a subscriber loop. It will be further appreciated that a remotely generated receive signal, $V_{RX}$, may be applied at the secondary of the transformer 59. The receive signal, $V_{RX}$, may be inductively coupled from the secondary winding of the isolation transformer 59 to the primary winding of the isolation transformer 59, where in accordance with the turns ratio of 1:N a scaled version of the receive signal, $V_{RX}'$, may be electrically coupled to the active termination line driver 110.

As is also illustrated in FIG. 5, the feedback voltage, $V_F$, which may be amplified by a sense amplifier 130 in some implementations, is applied at a second output of the active termination line driver 110. As illustrated, the feedback voltage, $V_F$, is applied to a first circuit 152 having a transfer function labeled, $H_{TXF}$. After processing by the first circuit 152, the processed feedback voltage is applied at a negative input terminal of the hybrid amplifier 160. In the functional block diagram illustrated in FIG. 5, the negative input terminal of the hybrid amplifier 160 takes the form of an adder 162.

As further illustrated in FIG. 5, the line driver amplifier output voltage, $V_O$, is applied at a third output of the active termination line driver 110. As shown, the output voltage or $V_{DUPLEX}$ is applied to both a second circuit 154 and a third circuit 156. The second and third circuits 154, 156, each may be characterized by their own separate and distinct transfer function herein labeled, $H_{TXO}$ and $H_{RX}$, respectively. After processing by the second and third circuits 152, 154, the processed output voltage emulating the transmit signal is applied to a negative input terminal of the hybrid amplifier 160, whereas, the processed output voltage emulating the receive signal is applied to a positive input terminal of the hybrid amplifier 160. As is further illustrated in the functional block diagram of FIG. 5, the three processed signals (e.g., the output signals from the first, second, and third circuits) are mathematically combined and amplified within the hybrid amplifier 160 by an output stage 165 having a gain, $G_{Hyb}$. As shown, an output of the active termination hybrid 150, herein labeled, $V_{HYBRID\ OUT}$, may then be made available for further processing by a CO-AFE 45 (FIG. 2) or other similar device designated for processing the remotely generated receive signal.

An advantage associated with the composite line driver-hybrid circuit 100 of FIG. 5 is a considerable reduction in power consumption, which may be achieved by reducing the supply voltage to the line driver amplifier. Further reduction in power consumption may be achieved by eliminating the traditional back-matching resistors. By eliminating the back-matching resistors, the present implementation reduces the line driver output voltage swing nearly in half. The line driver-hybrid circuit 100 allows simultaneous data transmission and reception from a transmission line 30 via an emulated terminating impedance, $R_O$, which is the output resistance as seen by primary winding of the isolation transformer 59 looking into the active termination line driver 110 output. The remaining output signals from the active termination line driver, $V_O$, which is proportional to the load voltage, $V_L$, and $V_F$, (which is proportional to the load current, $I_L$) are processed by the three path active termination hybrid 160, which performs the echo cancellation required in a full duplex line transceiver. By appropriately choosing circuit elements to generate the three transfer functions, $H_{TXF}$, $H_{TXO}$, and $H_{RX}$, the output of the active termination hybrid 150 closely resembles a "trans-hybrid loss" which is achieved in conventional hybrid implementations.

Figure 6:
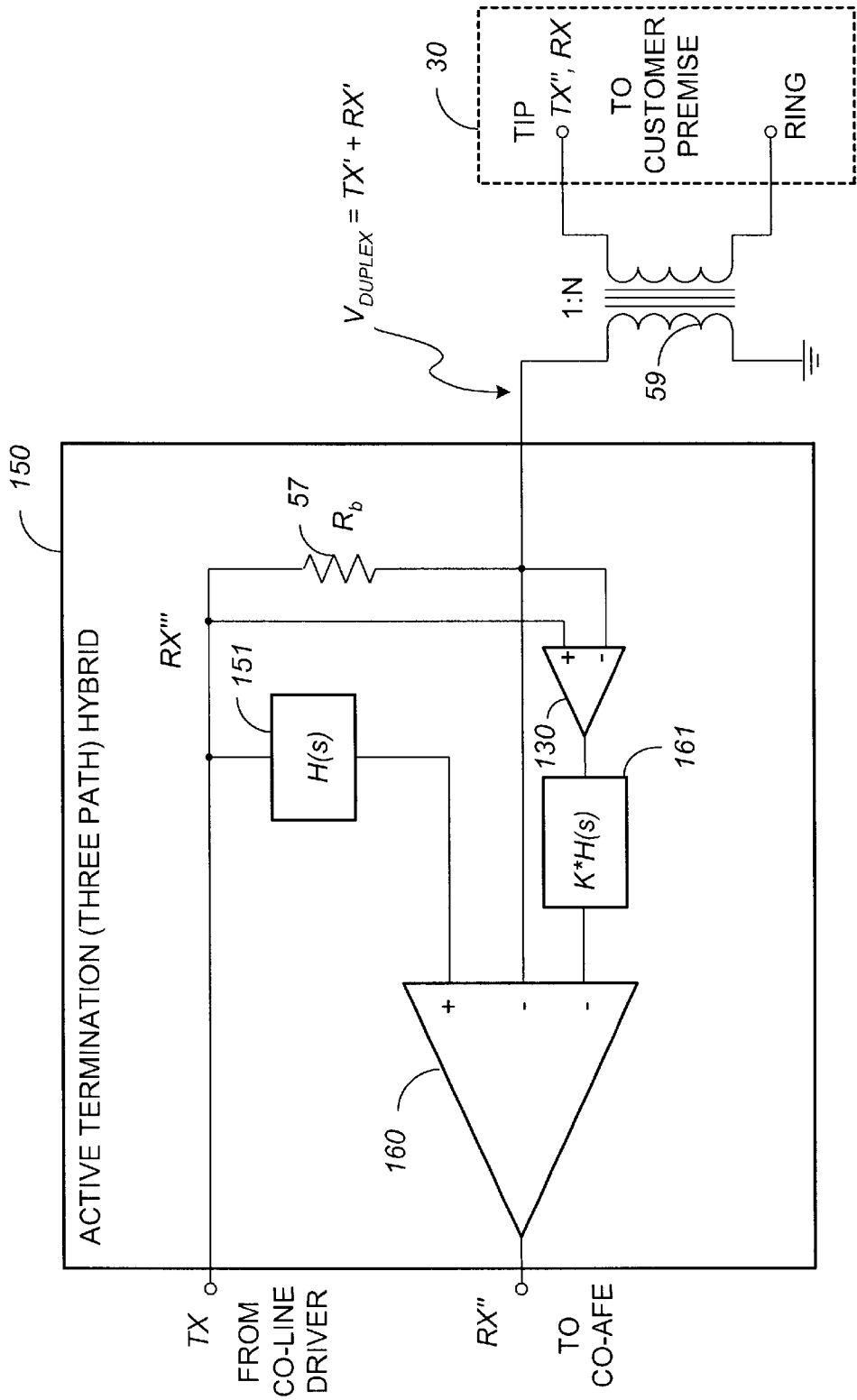
FIG. 6 is a circuit schematic that illustrates operation of the active termination hybrid of FIG. 5.

The improved line driver-hybrid circuit 100, having been introduced and described with regard to the functional block diagram of FIG. 5, reference is now directed to FIG. 6, which presents a circuit schematic that illustrates operation of the active termination hybrid of FIG. 5. The objective is to design a hybrid network, H(s), such that $E(s) \approx R(s) = T(s)*H(s)$. From FIG. 3, $H(s)=Z_b/(Z_m+Z_b)$. For the hybrid of FIG. 3 to operate correctly, it is assumed that the transmit signal, TX, acts as a low impedance source. Under this condition, the back-matching resistor, $R_b$ 57, will appear to be grounded on the TX end. The voltage at the node between the first impedance, $Z_b$ 53, and the second impedance, $Z_m$ 55, will not vary with a receive signal stimulus, RX'. However, the voltage observed on the node will simulate the echo signal. Consequently, given properly selected first and second impedance values (i.e., $Z_b$ 53 and $Z_m$ 55) the output of the hybrid amplifier 61, RX", will contain an amplified version of RX'and a significantly attenuated version of TX'as present in the signal $V_{DUPLEX}$.

Figure 3:
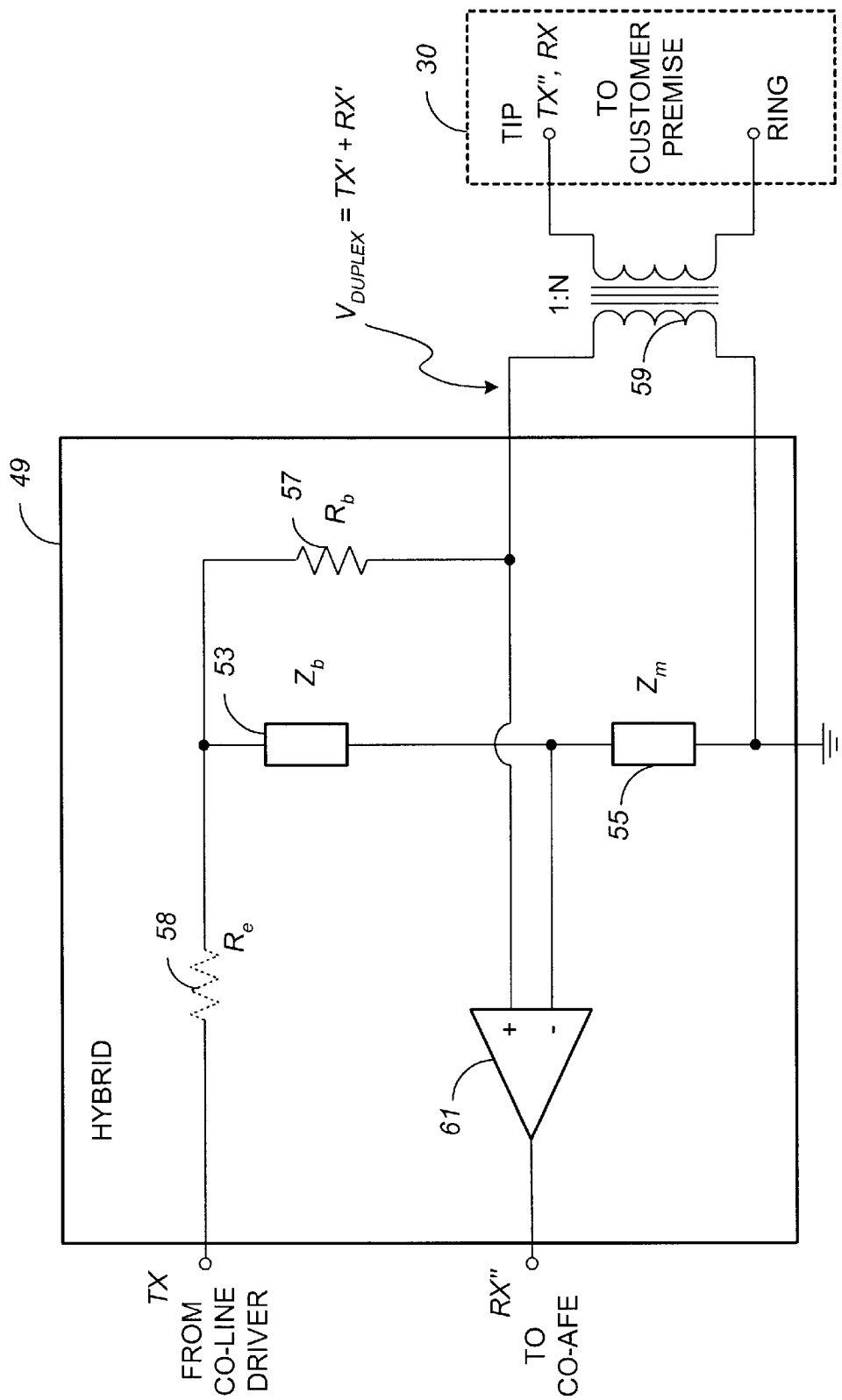
FIG. 3 is a prior art circuit schematic of a conventional hybrid that may be used to implement the xDSL communication link of FIG. 2.

For the case of active termination the output signal TX does not act like a virtual ground but instead will act like a resistor (see Re 58 in FIG. 3). Hence an attenuated version of the input signal, RX', will appear on the node between the back-matching resistor, $R_b$ 57, and the first impedance, $Z_b$ 53 (RX'''). Under these conditions as shown in FIG. 6, $$RX''=RX'*K*(1-H(s)*RX'''), \quad \text{Eq. 8}$$

where K is the gain of the hybrid amplifier 160. Consequently, RX" is no longer a scaled version of RX'.

The active termination (three path) hybrid 150 illustrated in FIG. 6 corrects the signal forwarded to the CO-AFE 45 by sensing the voltage across the back-matching resistor, $R_b$ 57. The sensed voltage may then be passed through a filter network with a similar transfer function, H(s), and a gain, K. As shown in FIG. 6, this additional filter with the transfer function, K*H(s) 161, can be applied in order to make the output of the active termination hybrid 150 RX" operate as a scaled version of RX' (as in the case without active termination). The introduction of the additional filter 161 does not adversely impact the echo canceling properties of the conventional hybrid 49 (e.g., the "Two Path Hybrid" of FIG. 3).

The modified "Three Path Hybrid" shown in FIG. 6 now requires two networks, H(s) and K*H(s), where K is simply a scaling factor. A problem with extending the conventional hybrid methodology (see the hybrid 49 of FIG. 3) is that two networks are now required. Because the networks tend to be complicated in nature requiring several components to realize the desired transfer function, H(s), extending the conventional methodology to generate a three path hybrid can be costly in both part cost and board area.

The design described below with regard to the exemplary circuit of FIG. 7, reveals a method for reducing the complexity of the required transfer functions for the two transmit functions shown in the circuit of FIG. 6. In this regard, the exemplary circuit may contain an upper portion (i.e., those circuit elements above the dashed line that may be used to form the active termination line driver 110 of FIG. 5) and a lower portion (i.e., those circuit elements below the dashed line that may be used to for the active termination hybrid 150 of FIG. 5).

The upper portion circuit elements may be inductively coupled to a transmission line 30 via an isolation transformer 159. In this particular embodiment, the isolation transformer 159 is a dual winding transformer. As illustrated in FIG. 7, the dual-secondary windings of the isolation transformer 159 may be coupled to each other via a filtering capacitor as required to meet various transmission line operating standards. As illustrated, the current sensing resistor, $R_{Sen}$, is disposed between the dual transformer windings on the primary side of the isolation transformer 159. In this particular embodiment, the sensing amplifier 130, introduced in the functional block diagram of FIG. 5, may not be required and is absent from the present circuit schematic.

Figure 7:
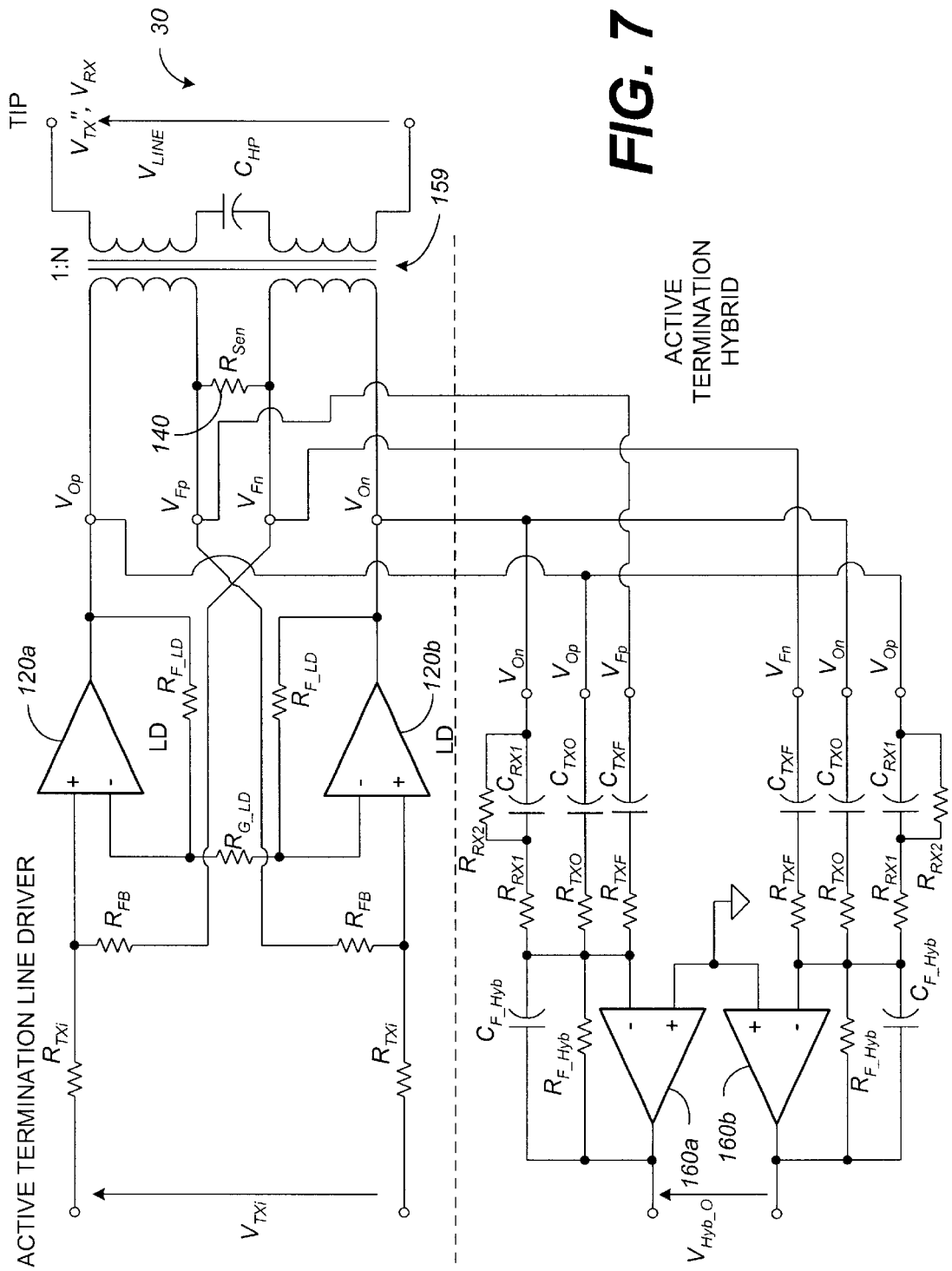
FIG. 7 is a detailed circuit schematic of the combination line driver-hybrid of FIG. 5.

As is further illustrated in the circuit schematic of FIG. 7, the line driver amplifier 120 of FIG. 5, may be implemented in a balanced dual amplifier configuration by a pair of line driver amplifiers 120a and 120b. It will be appreciated that the LD resistors, $R_{F\_LD}$ and $R_{G\_LD}$ may be selected to adjust the gain of the line driver amplifier 120, $G_{LD}$. A first resistive network formed by the arrangement of $R_{TXi}$ and $R_{FB}$ around the line driver amplifier 120a and 120b positive terminals may be selected to determine the feedback gain, $\beta_F$, the input attenuation, $\alpha$, and the input impedance seen by the input voltage $V_{TXi}$. By appropriately choosing component values, the desired target parameters of the active termination line driver 110, namely output resistance, $R_O$, transmit gain, $G_{TX}$, and input resistance, $R_{IN}$, may be selectively met.

In cases where more flexibility is required, a differential sense amplifier can be added in the feedback circuit path (i.e., between $R_{Sen}$ and the $V_F$ terminals). When a differential sense amplifier 130 (FIG. 5) is added the differential sense amplifier 130 should be capable of suppressing any common mode signals, thus avoiding common mode oscillation problems. This feature can be achieved by implementing the sense amplifier with a dual non-inverting amplifier topology (e.g., for printed circuit board level implementations) or through a single differential amplifier (e.g., as may be achieved via an integrated circuit design having an internal common mode feedback loop.) For printed circuit board implementations where a sense amplifier 130 (FIG. 5) is required, the active termination line driver 110 circuit schematic illustrated in FIG. 7, combined with a dual non-inverting amplifier topology, guarantees a common mode loop gain of less than one, thus eliminating the possibility of uncontrollable common mode voltage oscillations.

As is further illustrated in the circuit schematic of FIG. 7, the upper portion circuitry implementing the active termination line driver 110 of FIG. 5, provides a balanced set of signal outputs. For example, the line driver amplifier 120 output, $V_O$, is formed by a positive signal component, $V_{Op}$, at the output of the line driver amplifier 120a and a negative signal component, $V_{On}$, at the output of the line driver amplifier 120b. Similarly, the feedback voltage, $V_F$, is formed by a positive signal component, $V_{Fp}$, at the high voltage terminal of $R_{Sen}$ 140 and a negative signal component, $V_{Fn}$, at the low voltage terminal of $R_{Sen}$ 140. As is also illustrated in the circuit schematic of FIG. 7, these active termination line driver outputs may be coupled to the active termination hybrid 150 (FIG. 5) to recover a remotely generated receive signal from the transmission line 30.

As is further illustrated in the circuit schematic of FIG. 7, the active termination hybrid 150 of FIG. 5, may be implemented in a balanced dual amplifier configuration by a pair of hybrid amplifiers 160a and 160b. It will be appreciated that the hybrid resistors, $R_{F\_Hyb}$, may be selected to adjust the gain of the hybrid amplifier 160. First and second impedance networks formed by the arrangement of, $R_{TXF}$, $R_{TXO}$, $R_{RX1}$, and $R_{RX2}$, along with capacitors, $C_{TXF}$, $C_{TXO}$, and $C_{RX1}$, around the negative terminals of the hybrid amplifiers 160a and 160b may be implemented with selected resistance and capacitance values respectively to emulate the three transfer functions, $H_{TXF}$, $H_{TXO}$, and $H_{RX}$.

As is further illustrated, $V_{Op}$, the positive signal component of the line driver amplifier 120 is applied to a portion of the first impedance network formed by a series combination of $C_{TXO}$ and $R_{TXO}$ before the signal is forwarded to the parallel combination of $C_{F\_Hyb}$ and $R_{F\_Hyb}$ that are interposed between the output and negative input terminal of the hybrid amplifier 160a. In addition, $V_{Op}$, is applied to a portion of the second impedance network formed by the parallel combination of $C_{RX1}$, and $R_{RX2}$ in series with $R_{RX1}$, before the signal is forwarded to the parallel combination of $C_{F\_Hyb}$ and $R_{F\_Hyb}$ that are interposed between the output and negative input terminal of the hybrid amplifier 160b.

Similarly, $V_{On}$, the negative signal component of the line driver amplifier 120 is applied to a portion of the first impedance network formed by the parallel combination of $C_{RX1}$ and $R_{RX2}$ in series with $R_{RX1}$, before the signal is forwarded to the parallel combination of $C_{F\_Hyb}$ and $R_{F\_Hyb}$ that are interposed between the output and negative input terminal of the hybrid amplifier 160a. In addition, $V_{On}$, is applied to a portion of the second impedance network formed by a series combination of $C_{TXO}$ and $R_{TXO}$ before the signal is forwarded to the parallel combination of $C_{F\_Hyb}$ and $R_{F\_Hyb}$ that are interposed between the output and negative input terminal of the hybrid amplifier 160b.

Concurrently, $V_{Fp}$, the positive signal component at the current sensing resistor, $R_{Sen}$, is applied to the series combination of $R_{TXF}$ and $C_{TXF}$ within the first impedance network. The processed positive voltage component of the feedback signal is then forwarded to the parallel combination of $C_{F\_Hyb}$ and $R_{F\_Hyb}$ that are interposed between the output and negative input terminal of the hybrid amplifier 160a. $V_{Fn}$, the negative signal component at the current sensing resistor, $R_{Sen}$, is applied to the series combination of $R_{TXF}$ and $C_{TXF}$ within the second impedance network. The processed negative voltage component of the feedback signal is then forwarded to the parallel combination of $C_{F\_Hyb}$ and $R_{F\_Hyb}$ that are interposed between the output and negative input terminal of the hybrid amplifier 160b.

As a result of the circuit configuration within the active termination hybrid 150, the three input signal components are combined in such a way that the output of the active termination hybrid 150, herein labeled, $V_{Hyb\_O}$, emulates the remotely generated receive signal, $V_{RX}$, at the secondary of the isolation transformer 159. It can be shown that by appropriately choosing component values for each of the circuit elements in the first and second impedance networks, that the active termination hybrid 150 achieves an average normalized trans-hybrid loss similar to that of a regular two-path hybrid that requires back-matching resistors.

A "Regular Two Paths Hybrid" (e.g., the hybrid circuit of FIG. 3) can be realized with a single complex network. The transfer function, H(s), for a given line 30 and transformer 59 combination can be accurately approximated for a twisted-pair transmission line 30 without bridged taps or stubs by the following equation:

$$R(s) = T(s) * \left[ \frac{K*s*(1+s*T_3)}{(1+s*T_1)*(1+s*T_2)} \right] \qquad \text{Eq. 9}$$

where, K is a gain constant, $T_n$ are time constants that will best fit an optimum hybrid vector over the output transmission frequency range, T(s) is the output of the line driver (TX) and R(s) is the simulated echo transfer function that is designed to approximate the actual echo signal, E(s) (labeled $V_{DUPLEX}$ in FIG. 3). The "Regular Two Paths Hybrid" routes the transmit signal, T(s), through a hybrid network having a transfer function, H(s), and subtracts this simulated echo signal from the receive signal. Since the receive signal contains both an input signal, I(s), and the echo from the transmit, E(s), proper manipulation of the transfer function, H(s), can cancel or remove almost all the echo.

The active termination hybrid 150 takes the first equation and simply rearranges the terms as follows:

$$R(s) * \frac{(1+s*T_2)}{(1+s*T_3)} - T(s) * \left[ \frac{K*s}{(1+s*T_1)} \right] = 0. \qquad \text{Eq. 10}$$

Instead of routing just the transmit signal through a hybrid network, both the transmit and receive signals may be routed through networks each having a single pole and zero. This technique simplifies the passive realization of the active termination hybrid 150. The active termination hybrid network is greatly simplified over the prior art approach because only a single resistor-capacitor combination is used for each T(s) source. It will be appreciated that the prior art approach requires an entire hybrid network for each T(s) source.

An additional benefit derived from the proposed technique is that the single network associated with the T(s) signal is dependent only on the isolation transformer 159 (i.e., the network emulates a high-pass response). Therefore, to tune the active termination hybrid 150 to other transmission lines only requires changing the network associated with R(s).

Finally, the active termination hybrid networks are referenced to a virtual ground (current summing) as a result, the hybrid amplifier 160 can be safely operated from a supply rail that is much lower than that of the active termination line driver 110 without attenuation. Once the time constants are determined, the design scales quite easily to multiple applications. It will be appreciated that more complex lines (i.e., transmission lines 30 with bridged taps, stubs, etc.) can also be approximated by adding more terms to the right side of equation 9 (above). The separation technique will still hold in these more complex situations. However, the resulting networks will be more complex and may not be realized with only resistors and capacitors arranged in a network.

Figure 8:
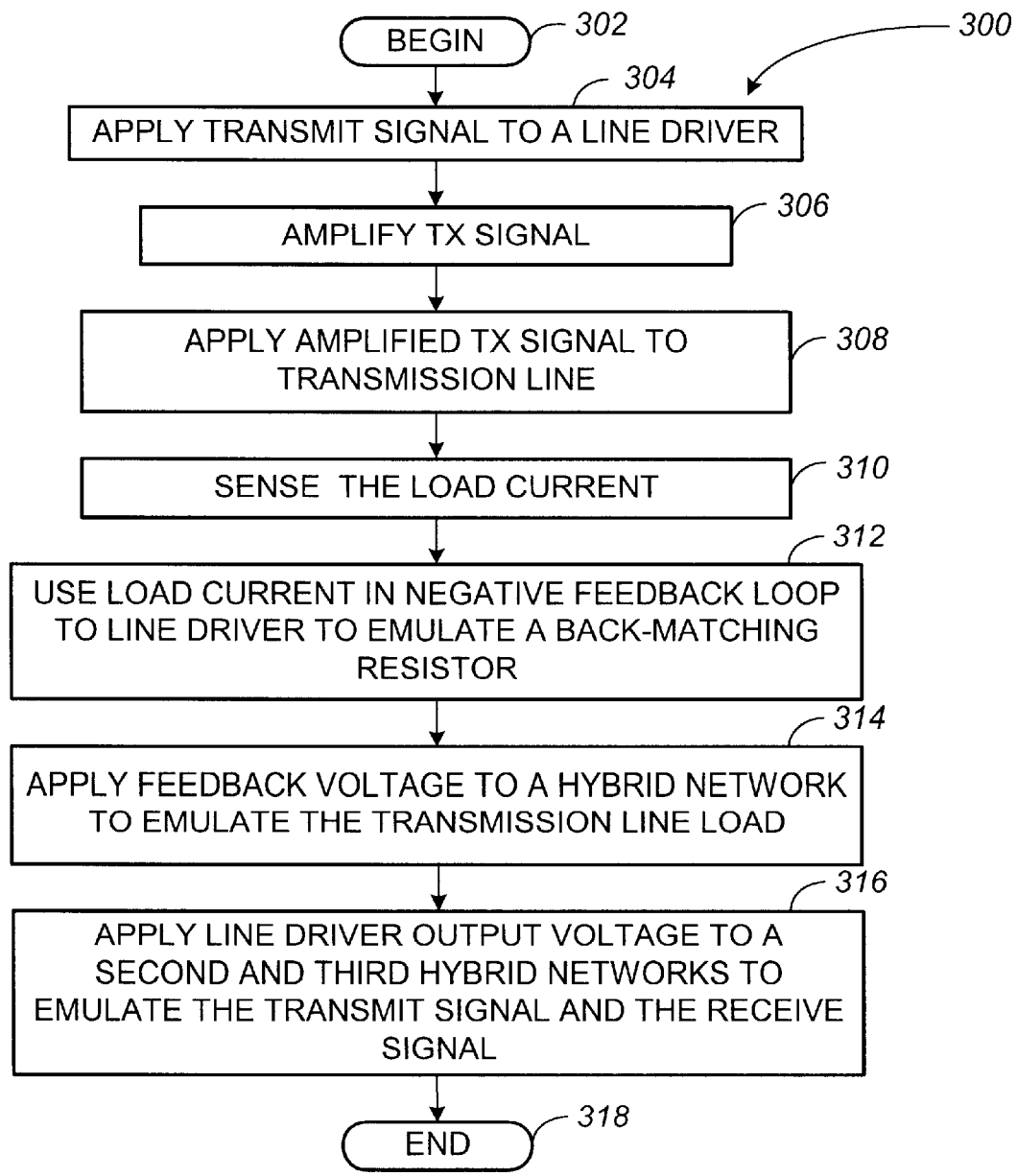
FIG. 8 is a flowchart highlighting a method of performing active transmission line termination that may be used by the circuit of FIG. 7 to provide a power efficient solution for systems designed to output a signal on a metallic transmission line.

Reference is now directed to FIG. 8, which presents a flowchart highlighting a method of performing active transmission line termination that may be used by the circuit of FIG. 7 to provide a power efficient solution for systems designed to output a signal on a metallic transmission line. In this regard, the method for increasing the stability, power efficiency, and accuracy of a line driver, while actively terminating a transmission line 300 starts with step 302, herein designated as "Begin." The method for actively terminating a transmission line 300 may be configured to apply a locally generated transmit signal to a line driver as indicated in step 304. Next, in step 306, the method for actively terminating a transmission line 300 may be configured to amplify the local transmit signal in accordance with at least that power required to successfully drive the transmit signal along a transmission line 30. As indicated in step 308, the amplified transmit signal may then be applied to the transmission line 30.

While the transmit signal is being applied to the transmission line, the method for actively terminating a transmission line 300 may sense the load current as indicated in step 310. As shown in step 312, the load current may then be applied in a negative feedback loop to emulate a back-matching resistor typically used along with hybrids. Next, in step 314, the method for actively terminating a transmission line 300 may apply a feedback voltage derived from the sensed load current to a hybrid network selected for the ability to emulate the transmission line load. As illustrated in step 316, the method for actively terminating a transmission line 300 may then apply the line driver output voltage to second and third hybrid networks selected to emulate the transmit signal and the receive signal. It will be appreciated that method steps 304 through 316 may be repeated as desired to actively terminate a transmission line coupled to a circuit or circuit combination practicing the method steps. Note that any suitable method for aborting and/or terminating the method for actively terminating a transmission line 300 herein described may be used as illustrated in step 318, labeled, "End."

Figure 9:
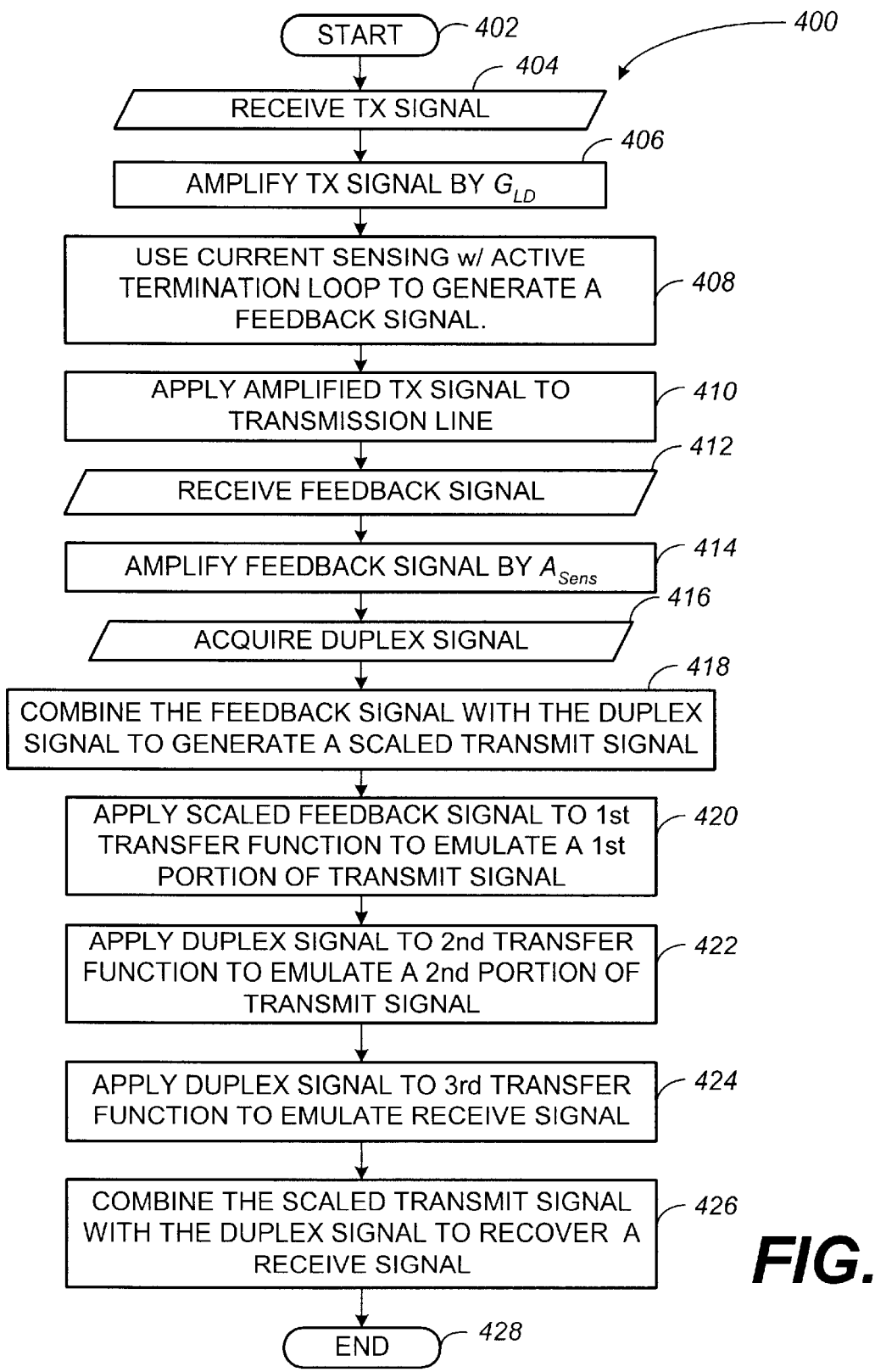
FIG. 9 is a flowchart highlighting a method for recovering a remotely generated signal from a transmission line in a duplex communication system that may be practiced by the circuit of FIG. 7.

Reference is now directed to FIG. 9, which illustrates a method for recovering a remotely generated signal from a transmission line in a duplex communication system that may be used by the circuit of FIGS. 5 and 7 to provide a power efficient solution for systems designed to output a signal on a metallic transmission line. In this regard, the method for recovering a remotely generated signal from a transmission line in a duplex communication system 400 starts with step 402, herein designated as "Begin." The method for recovering a remotely generated signal from a transmission line in a duplex communication system 400 may be configured to receive a previously generated transmit signal as indicated in step 404. Once the transmit signal is available, the composite line driver-hybrid circuit 100 of FIG. 5, or another suitable circuit or system, may amplify the transmit signal as illustrated in step 406. As further illustrated in step 408 of FIG. 9, the method for recovering a remotely generated signal from a transmission line in a duplex communication system 400 may proceed by sensing the load current to generate a feedback signal. The amplified transmit signal may be applied to the transmission line 30 (FIGS. 5 and 7) as shown in step 410.

The method for recovering a remotely generated signal from a transmission line in a duplex communication system 400 may continue with step 412 where the feedback signal is received. The method for recovering a remotely generated signal from a transmission line in a duplex communication system 400, having generated and received the feedback signal, may proceed by amplifying the feedback signal as illustrated in step 414. Next, the method for recovering a remotely generated signal from a transmission line in a duplex communication system 400, may acquire a duplex signal transmission from a transmission line as indicated in step 416. The method for recovering a remotely generated signal from a transmission line in a duplex communication system 400, may be configured to combine the feedback signal with the duplex signal to generate a scaled transmit signal as illustrated in step 418.

The method for recovering a remotely generated signal from a transmission line in a duplex communication system 400 may then proceed to apply a scaled version of the feedback signal to a first transfer function to emulate a first portion of the local transmit signal as indicated in step 420. Substantially concurrently, the method for recovering a remotely generated signal from a transmission line in a duplex communication system 400 may apply the duplex signal to a second transfer function to emulate a second portion of the transmit signal as shown in step 422. Along with steps 420 and 422, the method for recovering a remotely generated signal from a transmission line in a duplex communication system 400 may apply the duplex signal to a third transfer function to emulate the remote generated receive signal as illustrated in step 424. Next, the resulting signals from steps 420 through 424 may be mathematically combined to recover the remotely generated receive signal as shown in step 426.

It will be appreciated that method steps 404 through 426 may be repeated as desired to actively terminate a transmission line while recovering a remotely generated receive signal coupled to a circuit or circuit combination practicing the method steps. Note that any suitable method for aborting and/or terminating the method for recovering a remotely generated signal from a transmission line in a duplex communication system 400 herein described may be used as illustrated in step 428, labeled, "End."

It is significant to note that the sequences of method steps presented in FIGS. 8 and 9 are presented by way of example only. Those skilled in the art will appreciate that particular steps may in fact be performed out of sequence or substantially simultaneously. For example, once the transmit signal is received and amplified it may be applied to the transmission line at any time prior to acquiring the duplex signal transmission from the transmission line. As a result step 410 may be performed as early or substantially simultaneously across a range of steps generally defined from after step 406 to before step 416.

In the preferred embodiment of the present invention, which is intended to be a non-limiting example, each of the functions herein introduced and described may be implemented through a combination of an active termination line driver 110 with an active termination hybrid 150 in a circuit configuration. However, it will be appreciated that the method for actively terminating a transmission line 300 and the method for recovering a remotely generated signal from a transmission line in a duplex communication system 400 as illustrated in FIGS. 8 and 9 may comprise a set of processing steps that may be implemented in software and executed by a computing device in communication or integrated within the aforementioned devices.

A software or firmware based system, which comprises an ordered list of executable instructions for implementing logical functions, can be embodied in any computer readable medium for use by, or in connection with, an instruction execution system, apparatus, or device such as a computer based system, processor containing system, or other systems that can fetch the instructions from the instruction execution system, apparatus, or device and execute the instructions. In the context of this document, a "computer readable medium" can be any means that can contain, store, communicate, propagate or transport the program for use by or in connection with the instruction execution system, apparatus or device. The computer readable medium can be, for example, but not limited to, an electronic, magnetic, optical, electromagnetic, infrared or semiconductor system, apparatus, device, or propagation medium. More specific examples (a non-exhaustive list) of the computer readable medium would include the following: an electrical connection (electronic) having one or more wires, a portable computer diskette (magnetic), a random access memory (RAM) (magnetic), a read only memory (ROM) (magnetic), an erasable program read only memory (EPROM or flash memory) (magnetic), an optical fiber (optical), and a portable compact disk read only memory (CDROM) (optical). Note that the computer readable medium could even be paper or another suitable medium upon which the program is printed, as the program can be electronically captured, via for instance, optical scanning of the paper or other medium, then compiled, interpreted or otherwise processed in a suitable manner, if necessary, and then stored in a computer memory.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of the present invention and protected by the following claims.

What is claimed is:

1. An active termination transmission line interface, comprising:
   a power amplifier configured with a first input for receiving a transmit signal, a second input for receiving an amplified feedback signal, and an output configured to provide an amplified version of the transmit signal to the transmission line;
   a current sensing resistor electrically coupled to the power amplifier output and configured to generate a feedback signal proportional to a load current; and
   a feedback amplifier configured to receive the feedback signal and provide the amplified feedback signal to the second input of the power amplifier, wherein the amplified version of the transmit signal is proportional to a load voltage.

2. The transmission line interface of claim 1, wherein the current sensing resistor is coupled in parallel with the amplified transmit signal and electrical ground.

3. The transmission line interface of claim 1, wherein from the perspective of the transmission line, the active termination transmission line interface is the equivalent of an amplifier in series with an emulated back-matching resistor.

4. The transmission line interface of claim 1, wherein the power amplifier gain and the emulated back-matching resistor have values that maintain a constant transmit signal voltage sign.

5. The transmission line interface of claim 1, wherein the amplified transmit signal and the feedback signal are suited for driving a hybrid circuit.

6. The transmission line interface of claim 5, further comprising:
   a sense amplifier configured to receive the feedback signal from the current sensing resistor and to generate an amplified version of the feedback signal suitable for driving the hybrid circuit and the feedback amplifier.

7. The transmission line interface of claim 6, wherein the resistance of the emulated back-matching resistor is a function of the transmit gain of the power amplifier, the feedback amplifier, and the sense amplifier.

8. The transmission line interface of claim 7, wherein the transmit gain of the feedback amplifier is controllably adjusted to modify the output impedance as seen by the transmission line.

9. An active termination line driver-hybrid circuit, comprising:
   means for amplifying a transmit signal;
   means for emulating a back-matching resistance using a load current sensed feedback voltage in a negative feedback loop; and
   means for applying the amplified transmit signal and the feedback voltage to a multiple path resistor-capacitor (R-C) network to echo cancel the transmit signal.

10. The line driver-hybrid of claim 9, wherein the means for emulating a back-matching resistance comprises a load current sensing means.

11. The line driver-hybrid of claim 9, wherein the means for emulating a back-matching resistance includes means for amplifying a feedback signal responsive to the load current such that the emulated back-matching resistance appears to have a resistance value equivalent to the product of the transmit signal amplification gain and the feedback signal amplification gain.

12. The line driver-hybrid of claim 10, wherein the current sensing means comprises a resistor.

13. A signal transmission unit, comprising:
   an active termination line driver-hybrid in cooperation with a transmission line, wherein the active termination line driver-hybrid emulates a back-matching resistor having a resistance value equivalent to the product of the transmit signal amplification gain and the feedback signal amplification gain; wherein the active termination line driver-hybrid is configured to recover a remotely Generated receive signal.

14. A communication system, comprising:
   a transmission unit having an active termination line driver-hybrid in cooperation with a transmission line, wherein the active termination line driver-hybrid emulates a back-matching resistor having a resistance value equivalent to the product of the transmit signal amplification gain and the feedback signal amplification gain; wherein the active termination line driver-hybrid is configured to recover a remotely generated receive signal.

15. A method for actively terminating a transmission line, comprising:
   applying a transmit signal to an input of a line driver;
   amplifying the transmit signal;
   applying the amplified transmit signal to a transmission line load to generate a load current;
   sensing the load current;
   applying the sensed load current in a negative feedback loop to generate a feedback signal responsive to the load current such that an output impedance emulates a back-matching resistor;
   applying the feedback signal to a hybrid network to emulate the transmission line load; and
   applying the line driver output voltage to the hybrid network to emulate the transmit signal and a remotely generated receive signal coupled to the transmission line.

16. The method of claim 15, wherein the load current is sensed with a resistor having a resistance value less than the expected transmission line load impedance.

17. The method of claim 15, wherein the impedance of the emulated back-matching resistor is a function of the transmit gain of both a line driver power amplifier and a feedback amplifier.

18. The method of claim 17, wherein the transmit gain of the feedback amplifier is controllably adjusted to modify the output impedance as seen by the transmission line.

19. The method of claim 17, wherein the transmit gain of the feedback amplifier is controllably adjusted in response to scaling errors associated with the sensed load current.

20. A method for recovering a remotely generated signal from a transmission line in a duplex communication system, comprising:

applying a transmit signal to an input stage of a line driver;

amplifying the transmit signal with a line driver amplifier;

using an active termination feedback control loop in cooperation with the line driver amplifier to generate a feedback signal responsive to a load current to generate a line driver output impedance that emulates a back-matching resistor;

applying the combination of the amplified transmit signal and the amplified feedback signal on the transmission line, a first resistor-capacitor (R-C) network to emulate the transmit signal, and a second R-C network to emulate a receive signal;

applying the feedback signal to a third R-C network to emulate the transmission line load; and combining the outputs from the first, second, and third R-C networks to recover the receive signal from the transmission line.

21. The method of claim 20, wherein the active termination feedback control loop senses the load current with a resistor having a resistance value less than the transmission line load impedance.

22. The method of claim 20, wherein the impedance of the emulated back-matching resistor is a function of the transmit gain of both the line driver power amplifier and a feedback amplifier.

23. The method of claim 20, wherein the transmit gain of the feedback amplifier is controllably adjusted to modify the output impedance as seen by the transmission line.

24. The method of claim 20, wherein the transmit gain of the feedback amplifier is controllably adjusted in response to scaling errors associated with the sensed load current.

25. An active termination transmission line interface, comprising:

a power amplifier configured with a first input for receiving a transmit signal, a second input for receiving an amplified feedback signal, and an output configured to provide an amplified version of the transmit signal to the transmission line;

a current sensing resistor electrically coupled to the power amplifier output and configured to generate a feedback signal proportional to a load current;

a feedback amplifier configured to receive the feedback signal and provide the amplified feedback signal to the second input of the power amplifier, wherein the amplified version of the transmit signal is proportional to a load voltage;

wherein the amplified transmit signal and the feedback signal are suited for driving a hybrid circuit; and wherein the amplified transmit signal is applied at a first filter and at a second filter in an active termination hybrid.

26. The transmission line interface of claim 25, wherein the feedback signal is applied at a third filter in an active termination hybrid.

27. The transmission line interface of claim 26, wherein a filtered feedback signal and the filtered amplified transmit signal are mathematically combined to recover a remotely transmitted signal coupled on the transmission line.

28. The transmission line interface of claim 26, wherein a filtered feedback signal and the filtered amplified transmit signal are mathematically combined to remove the amplified transmit signal and the feedback signal.

29. The transmission line interface of claim 26, wherein the first, second, and third filters comprise a composite resistor-capacitor (R-C) network.

30. The line driver of claim 28, wherein the filtered transmit signal comprises transmit signal imperfections.

31. The line driver of claim 29, wherein the composite R-C network comprises a balanced network traversing both the negative input and the negative feedback loop of a first hybrid amplifier and the negative input and the negative feedback loop of a second hybrid amplifier.

32. The line driver of claim 30, wherein the transmit signal imperfections comprise noise and distortion introduced by the power amplifier.

* * * * *